US011180420B2

(12) United States Patent
Laskoski et al.

(10) Patent No.: US 11,180,420 B2
(45) Date of Patent: Nov. 23, 2021

(54) METAL NITRIDES AND/OR METAL CARBIDES WITH NANOCRYSTALLINE GRAIN STRUCTURE

(71) Applicant: The Government of the United States of America, as represented by the Secretary of the Navy, Arlington, VA (US)

(72) Inventors: Matthew Laskoski, Springfield, VA (US); Boris Dyatkin, Washington, DC (US); Teddy M. Keller, Fairfax Station, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/190,977

(22) Filed: Mar. 3, 2021

(65) Prior Publication Data

US 2021/0188716 A1 Jun. 24, 2021

Related U.S. Application Data

(63) Continuation of application No. 16/255,776, filed on Jan. 23, 2019, now Pat. No. 10,974,996.
(Continued)

(51) Int. Cl.
*C04B 35/80* (2006.01)
*C04B 35/64* (2006.01)
(Continued)

(52) U.S. Cl.
CPC .......... *C04B 35/80* (2013.01); *C01B 21/0617* (2013.01); *C01B 21/0641* (2013.01); *C01B 21/0682* (2013.01); *C01B 21/0761* (2013.01);

*C04B 35/515* (2013.01); *C04B 35/524* (2013.01); *C04B 35/583* (2013.01); *C04B 35/584* (2013.01); *C04B 35/58007* (2013.01); *C04B 35/58014* (2013.01); *C04B 35/58028* (2013.01); *C04B 35/58035* (2013.01); *C04B 35/591* (2013.01); *C04B 35/6261* (2013.01); *C04B 35/6264* (2013.01); *C04B 35/64* (2013.01); *C04B 35/76* (2013.01);
(Continued)

(58) Field of Classification Search
CPC ........ C04B 41/5058; C04B 2235/3817; C04B 35/83
See application file for complete search history.

(56) References Cited

U.S. PATENT DOCUMENTS 8,815,381 B2 * 8/2014 Keller .................. C04B 35/591
428/220

* cited by examiner

*Primary Examiner* — Noah S Wiese
(74) *Attorney, Agent, or Firm* — US Naval Research Laboratory; Joseph T. Grunkemeyer

(57) ABSTRACT

Disclosed is a composition having nanoparticles or particles of a refractory metal, a refractory metal hydride, a refractory metal carbide, a refractory metal nitride, or a refractory metal boride, an organic compound consisting of carbon and hydrogen, and a nitrogenous compound consisting of carbon, nitrogen, and hydrogen. The composition, optionally containing the nitrogenous compound, is milled, cured to form a thermoset, compacted into a geometric shape, and heated in a nitrogen atmosphere at a temperature that forms a nanoparticle composition comprising nanoparticles of metal nitride and optionally metal carbide. The nanoparticles have a uniform distribution of the nitride or carbide.

4 Claims, 15 Drawing Sheets

Related U.S. Application Data

(60) Provisional application No. 62/620,596, filed on Jan. 23, 2018.

(51) Int. Cl.
*C04B 35/58* (2006.01)
*C04B 35/583* (2006.01)
*C04B 35/584* (2006.01)
*C04B 35/626* (2006.01)
*C04B 35/76* (2006.01)
*C04B 35/83* (2006.01)
*C01B 21/076* (2006.01)
*C01B 21/06* (2006.01)
*C04B 35/591* (2006.01)
*C04B 35/524* (2006.01)
*C01B 21/068* (2006.01)
*C01B 21/064* (2006.01)
*C04B 35/515* (2006.01)

(52) U.S. Cl.
CPC .......... *C04B 35/83* (2013.01); *C01P 2002/72* (2013.01); *C04B 2235/386* (2013.01); *C04B 2235/3817* (2013.01); *C04B 2235/3856* (2013.01); *C04B 2235/3873* (2013.01); *C04B 2235/3886* (2013.01); *C04B 2235/404* (2013.01); *C04B 2235/421* (2013.01); *C04B 2235/428* (2013.01); *C04B 2235/46* (2013.01); *C04B 2235/48* (2013.01); *C04B 2235/5248* (2013.01); *C04B 2235/5454* (2013.01); *C04B 2235/604* (2013.01); *C04B 2235/656* (2013.01); *C04B 2235/658* (2013.01); *C04B 2235/761* (2013.01); *C04B 2235/77* (2013.01); *C04B 2235/80* (2013.01); *C04B 2235/95* (2013.01)

METAL NITRIDES AND/OR METAL CARBIDES WITH NANOCRYSTALLINE GRAIN STRUCTURE

This application is a continuation application of U.S. Pat. No. 10,974,996, issued on Apr. 13, 2021, which claims the benefit of U.S. Provisional Application No. 62/620,596, filed on Jan. 23, 2018. The provisional application and all other publications and patent documents referred to throughout this nonprovisional application are incorporated herein by reference.

TECHNICAL FIELD

The present disclosure is generally related to structure and synthesis of metal carbides and metal nitrides.

DESCRIPTION OF RELATED ART

Refractory transition metal carbides and nitrides have the highest known melting points (2600-3900° C.) out of all engineering materials. They also offer outstanding hardness, chemical inertness, wear resistance, electrocatalytic activity, electrical and thermal conductivity, and both ionizing and non-ionizing (neutron) absorption. Refractory metal carbides are typically prepared by powder metallurgy methods such as hot press sintering. Ordinarily, these techniques, which are both energy—and time—intensive, yield metal carbide ceramic composites that have a large granular structure, broad ceramic particle and grain size distribution, and are, subsequently, brittle. Powdered metal nitrides can be produced from metal particles in a flow of nitrogen but have to be formulated into shaped components under pressure and high temperatures. Films, fibers, and powders of these ceramics have been made from polymeric precursors, but neither polymer-derived ceramics nor reactive melt infiltration processes yield dense, pure, monolithic, and nanocrystalline metal carbides or metal nitrides.

Since the late 1960s, there has been an interest in ceramic materials that withstand high temperatures and exhibit high mechanical hardness. Their use includes, but is not limited to, applications such as tools for grinding/machining, ball bearings, armor components, reinforcement fibers and fillers (integrated in other materials), and turbine blades of vehicles and aircraft. However, to date, materials have found no success in structural applications, due to their brittleness, weakness in shear and tension, and poor shock resistance. More recently, there has been a resurgence of interest in ultra-high temperature materials for high-speed air and space vehicles. These vehicles, which include both single-use (expendable) and multi-use (reusable) systems, include manned and unmanned platforms that travel through various layers of atmosphere and/or space, and include a propulsion system (such as an air-breathing engine and/or a rocket motor) and/or are unpowered. These vehicles operate at sufficiently high velocities to generate high heat (in excess of 2,200° C.) and potential ablation degradation problems for leading edges and nose tips along with any propulsion system components. In order to offer reliable and durable performance, engine components must meet several requirements: high melting temperature, high strength, well-defined thermal conductivity, and ablation and environmental resistance (oxidative resistance). Successful large-scale implementation of these high-performance engineering solutions is contingent on the development of appropriate materials that can be easily processed into shaped components with the required thermomechanical and thermochemical demands and maintain their exceptional properties without active cooling systems at temperatures greater than 2,200° C. The refractory interstitial transition metal carbides are extremely hard and resist chemical, oxidative, ablative, or thermal damage. Unfortunately, they are also brittle and difficult to machine. Currently, there is no materials engineering and manufacturing solution to these limitations. However, an inexpensive method to manufacture these ceramics will provide materials that withstand extreme mechanical and thermal conditions and will afford tough shaped components.

Beyond high-temperature engineering applications, a current interest exists to develop metal carbides and metal nitrides with small particle sizes and high surface areas to function as catalysts or catalytic supports. Nanostructured tungsten carbide (WC) and iron nitride ($Fe_3N$) are promising examples. Selected metal carbides and nitrides, such as WC and $Fe_3N$, offer high catalytic efficiencies that compete with Pt/Pd/Ru, but are a much less expensive and more durable material alternative. Since they offer high thermal stability and chemical inertness, they withstand chemical reactions (driven by high temperature or electropotential) and retain high surface areas without catalyst poisoning, coarsening, or dissolution. These materials show promise in the anodes of direct methanol fuel cells (DMFC), which oxidize methanol and electrochemically split water. Strong chemisorption of CO on the noble metals makes these electrocatalysts susceptible to CO poisoning, blocking the active site for methanol oxidation. Consequently, the discovery of less expensive catalysts such as WC, which resists loss of its surface area to CO, facilitates large-scale commercialization of DMFCs. Other similar metal carbides and nitrides, such as tungsten nitride (W2N) and vanadium nitride (VN), have shown promise in methane carburization, pyridine hydrodenitrogenation, and other industrial processes.

BRIEF SUMMARY

Disclosed herein is a composition comprising: nanoparticles of a refractory-metal carbide and, optionally, nanoparticles of a refractory-metal nitride. The nanoparticles have a uniform distribution of the carbide or nitride.

Also disclosed herein is a composition comprising: a metal component selected from: nanoparticles or particles of a refractory metal, a refractory metal hydride, a refractory metal carbide, a refractory metal nitride, or a refractory metal boride, an organic compound consisting of carbon and hydrogen, and a nitrogenous compound consisting of carbon, nitrogen, and hydrogen.

Also disclosed herein is a method comprising: providing a precursor composition comprising: a metal component selected from: nanoparticles or particles of a refractory metal, or a refractory metal hydride; an organic compound consisting of carbon and hydrogen; and optionally a nitrogenous compound consisting of carbon, nitrogen, and hydrogen; milling the precursor composition; curing the precursor composition to form a thermoset composition; milling the thermoset composition; and heating the thermoset composition in an inert atmosphere at a temperature that forms a nanoparticle composition comprising nanoparticles of carbide of the refractory metal and optionally a nitride of the refractory metal.

BRIEF DESCRIPTION OF THE DRAWINGS

A more complete appreciation will be readily obtained by reference to the following Description of the Example Embodiments and the accompanying drawings.

DETAILED DESCRIPTION OF EXAMPLE EMBODIMENTS

Figure 1:
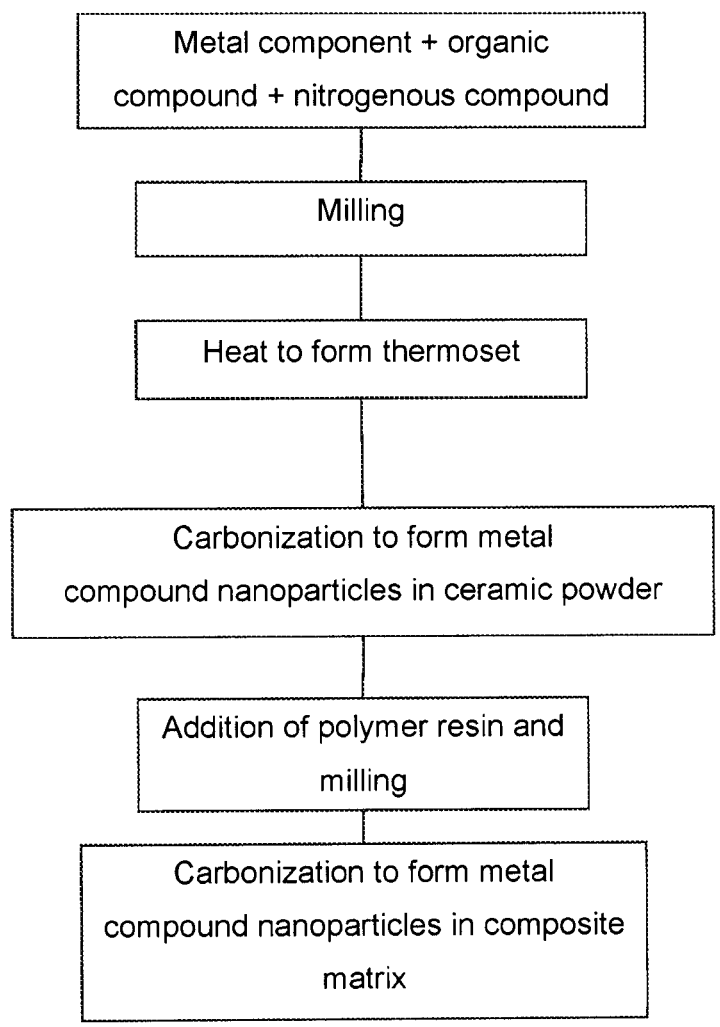
FIG. 1 schematically illustrates a process for forming the disclosed compositions.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

This disclosure concerns a method for in situ synthesis of pure nanoparticulate refractory metal nitrides and/or metal carbides with nanocrystalline grain structure. The method uses Group IV-VI metals and embeds them within a carbon matrix. The synthesis method uses nitrogen and/or argon atmospheres in a two-step process that, depending on customizable reaction methods, yields either a shaped ceramic composite monolith with structural integrity or a micropowder with the same composition. The synthesis method allows control over the crystallite grain size, density, shape, mechanical properties, hardness, magnetic susceptibility, and electrical/thermal conductivity. The material is designed for various engineering applications and can withstand temperatures up to and in excess of 3000° C.

Refractory metal carbide and nitride ceramics offer higher melting points (>3000° C.) than any other engineering materials. In order to synthesize ceramic components and dense shapes, the fabrication process subjects transition metal carbide/nitride powders to hot press sintering, which requires extremely high pressures (>200 MPa) and temperatures (>2000° C.). Powdered metal carbide precursor fabrication requires independent synthesis from metal particles, salts, oxides, and carbon (graphite or amorphous carbon) in a reducing hydrogen atmosphere at high temperatures (>2000° C.) to ensure high conversion to powdered metal carbides. Metal nitrides require spark plasma sintering, high-temperature autoclave treatment of polymers or metal salts, or reduction-nitridation of metal oxides. These processes are all expensive, energy-demanding, and difficult to scale up for industrial production. Sintered refractory ceramics exhibit grain coarsening and granularity of individual agglomerated particles, which embrittles these materials. Therefore, there is a need for a previously undeveloped cost-effective method that yields metal carbides and metal nitrides with high purities and customizable properties.

The synthesis method uses a two-step process. The first step mixes together the precursor composition that contains the following ingredients: (1) metal sources (metal powder and/or metal hydride micro/nanopowder, such as W, Ti/TiH$_2$, B, and Zr/ZrH$_2$); (2) meltable acetylenic-containing aromatic polymeric resin that contains solely carbon and hydrogen atoms; and (3) a nitrogen-rich polymeric resin that decomposes under high temperatures (optional). These precursors are pulverized/blended together for extended periods of time using a ball mill for a prescribed length of time. The various milled/powdered refractory metal-carbon based resin precursor compositions are, subsequently, thermally converted to the final ceramic using a two stage process. Stage 1 yields a powdered or monolithic metal carbide or metal nitride compositions, while stage 2 yields monolithic metal-nitride and metal carbide-carbon matrix compositions. Both stages involve pressureless heating of the powder (in a crucible or boat) or pressed thermoset/ceramic shape in a tube furnace up to 1500° C. under flowing nitrogen or argon atmospheres. Stage 1 yields pure metal carbides or metal nitrides and can be processed further, including oxidative removal of any excess carbon or pulverization into a fine ceramic powder. Stage 2 of the thermal treatment step involves milling of powdered metal nitrides and/or metal carbides (from stage 1) with small amounts of the polymeric resin, cold-pressing of resulting powder into shapes with variable form factors and dimensions, and thermally converting them to shaped ceramics using identical conditions as stage 1. In essence, the ceramic nanoparticles or nanocrystallites formed in step 1 are mixed with very small amounts of the carbon polymeric resin precursor, which acts as a binder and retains the ceramic particles in a matrix during its conversion to a thermoset. The two-stage heating process physically controls the ultimate ceramic size within the confines of the shaped thermoset, which is thermally converted into metal carbide or nitride monoliths.

Another aspect concerns formulations of carbon-fiber reinforced refractory metal carbide carbon-matrix composites. As an additional structural reinforcement process, carbon fibers are incorporated into various mixtures of precursor compositions that include pure metal/metal hydride powders (from Groups III-VI) and the meltable acetylenic-based polymer resins, which act as the sources of carbon. For metal nitride synthesis, a nitrogen-rich polymer resin is also incorporated into the mixture. The precursor powdered ceramic compositions (pure powdered ceramics and carbon precursor), which are described in step 1 above, are mixed with continuous carbon fibers or chopped carbon fibers, pressed into various shapes with different dimensions, and heated until conversion into shaped thermoset forms. The fiber-containing mixture is converted into a shaped thermoset solid at temperatures below 500° C. It is subsequently heated up to 1000-1500° C. and yields a carbon fiber-reinforced metal ceramic matrix composite. Heating in an inert atmosphere (argon) promotes synthesis of carbon fiber-reinforced refractory metal carbide-carbon matrix composites, while heating in a nitrogen atmosphere promotes synthesis of carbon fiber-reinforced refractory metal nitride-carbon matrix composites. Depending on the specific chemistry of the resulting ceramic, the tough, solid shaped composite can be used for structural applications and at temperatures that exceed 3000° C. The precursor compositions can contain a combination of different refractory metal compounds that will lead to a mixture of ceramics in the composite, which could be beneficial for specific applications.

Both approaches include two main factors. The first factor incorporates a nitrogen-rich polymer (with only carbon, hydrogen, and nitrogen atoms) that decomposes into nitrogen-containing compounds at high temperature and reacts with the adjacent metal atoms in the milled mixture to form metal nitrides. This yields a final dense ceramic that, instead of a carbide core and a nitride shell, features uniform metal nitride composition throughout the matrix. The second factor employs small amounts of the acetylenic-based polymer resin as a binder that densifies individual metal carbide and/or metal nitride particles during cold-pressing, retains them in a thermoset during heating up to 500° C., and converts to a carbon-ceramic matrix during heating up to 1500° C. This approach yields customizable dense metal carbides and/or nitrides from any metal ceramic powder without hot press sintering. The composites will have outstanding oxidative stabilities, tunable electrical and thermal conductivities, high densities and mechanical hardness, and melting temperatures that exceed 3000° C.

This approach, which can assemble WC nanoparticles into a matrix that is bound together with a carbon-based thermoset, yields continuous monoliths with tunable surface areas. Subsequently, this method may be used to manufacture nanostructured metal carbide catalysts for electrochemical energy storage, generation, and conversion.

A method has been developed to produce refractory metal (Ti, W, Nb, Zr, Mo, Cr, V, Ta, and Hf) carbides and nitrides in powdered and shaped solid configurations from milled precursor compositions. Precursor material mixtures, which are initially in powder form and can either remain powders or be cold-pressed into various shapes, contain pure metals or metal hydrides that are embedded in carbon-rich (and, optionally, nitrogen-rich) polymer resins. The ceramics are produced as nanoparticles, microparticles, or dense shapes with nanocrystalline domains.

The procedure employs a two-step process. The first step combines a) metal particles or metal hydrides (which desorb hydrogen at high temperatures and convert to similar metal particles) with b) carbon precursors that melt and contain only carbon and hydrogen as a powder composition and, optionally, with c) nitrogen-rich polymer resins that contain only carbon, nitrogen, and hydrogen and decompose at high temperatures. The carbon sources are melt-processable aromatic-containing acetylenes or low molecular weight polymers that exhibit extremely high char yields. The carbon precursor contains only C and H to insure that heteroatoms are not incorporated into the interstitial sites of the metal nanoparticles during the reaction to produce the nanocrystalline metal carbide and/or metal nitride at temperatures up to 1500° C. under inert atmospheres. If used, the nitrogen-rich polymer decomposes into hydrocarbons, ammonia gas, nitrogen gas, and other similar light molecules. The initial composition is milled and thermally converted to d) a stable thermoset with metal/metal hydride particles embedded in a rigid polymer matrix. The metal carbides or metal nitrides form between 600-1000° C. under inert conditions from reaction of the highly reactive metal particles with either the carbon precursor (degradation above 500° C.) or nitrogen gas, respectively, but the reaction can be made to occur faster at higher temperatures. Further thermal treatment under argon or nitrogen atmospheres converts the powdered composition into e) metal carbides or metal nitrides embedded in a carbon matrix. The appropriate pure metal powders react directly with the carbon in the acetylenic resin, while metal hydride particles first undergo in situ transformation into metal particles by thermally decomposing metal hydrides into metal and hydrogen gas. If used, nitrogen-rich polymer decomposes at temperatures below 800° C., and resulting nitrogen compounds react with both the polymer resin and the metal particles to yield metal nitrides. All enveloping carbon may be removed by oxidative (air) thermal exposure of the powdered mixture, which leaves solely metal carbide or metal nitride nanoparticles with nanocrystalline domains.

In the second step, the pure monocrystalline ceramic produced in step 1 is mixed with additional carbon resin (<10 wt. %) and milled for an extended period. The milled composition is then consolidated to shape under pressure and then heated up to about 300° C. under either nitrogen or argon, respectively, producing the shaped thermoset-containing ceramics. Further heating of the thermoset-containing ceramics up to 1000° C. affords high-density metal nitride or metal carbide composites that are enveloped by a thick carbon matrix. The composites retain the shape of the initially machined shaped ceramic-carbon resin precursors. In this step, the role of the polymer resin is to bind the ceramic particles together, facilitate their densification at high temperatures, and maintain a stable, rigid thermoset matrix that holds the particles in place and converts to a carbon-containing composite. As it chars, the polymer does not affect the chemistry of the already-formed metal ceramics but, instead, forms a nanostructured or amorphous elastic carbon and improves the density and structural integrity of the resulting monoliths.

The method (FIG. 1) starts with a metal component, an organic compound, and optionally a nitrogenous compound. The initial components may also optionally comprise fibers, carbon fibers, ceramic fibers, or metal fibers.

The metal component may be nanoparticles or particles of a refractory metal or a refractory metal hydride. The refractory metals may include titanium, tungsten, niobium, zirconium, molybdenum, chromium, vanadium, tantalum, and hafnium. One suitable metal component is zirconium hydride.

The organic compound consists of only carbon and hydrogen atoms, such as 1,2,4,5-tetrakis(phenylethynyl)benzene (TPEB) or a prepolymer thereof. Other phenylethynyl benzene compounds are also suitable.

The nitrogenous compound consists of only carbon, nitrogen, and hydrogen atoms. One suitable compound is 1,3,5-triazine-2,4,6-triamine or a prepolymer thereof.

Figure 2:
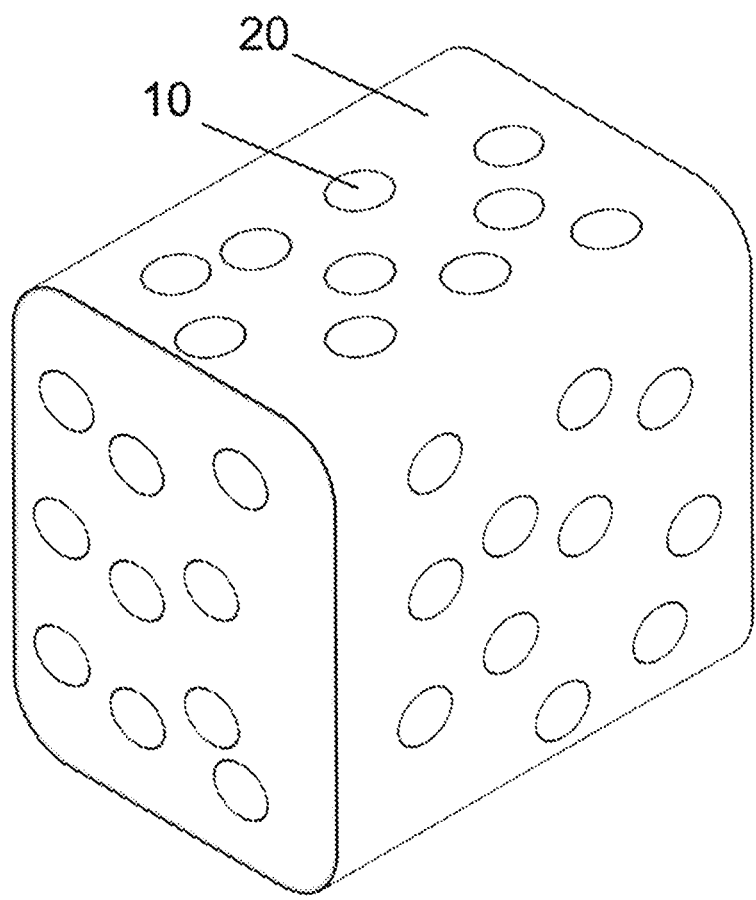
FIG. 2 schematically illustrates particles 10 embedded in a thermoset matrix.
Figure 3:
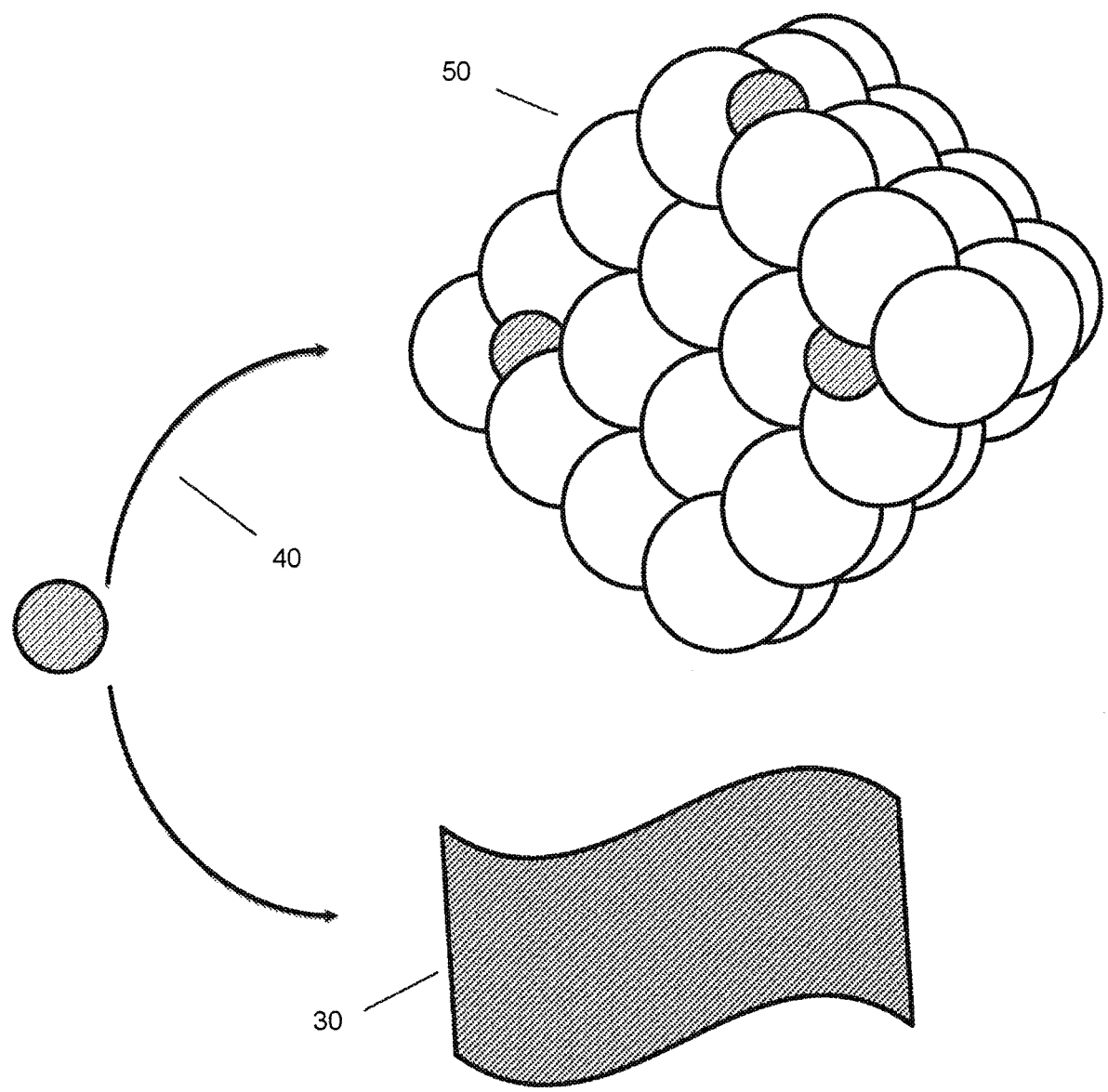
FIG. 3 schematically illustrates the transfer 40 of carbon atoms from the carbon matrix 30 to the nanoparticle 50.

The initial components are combined, milled, and heated in an inert atmosphere such as nitrogen or argon. The heating is performed at a temperature that causes organic compound to polymerize to a thermoset. The heating may also cause decomposition or reaction of the metal component to form nanoparticles. In this step, a metal hydride may decompose to form metal nanoparticles. The metal particles 10 would then be dispersed throughout the thermoset 20 as shown in FIG. 2. The cured composition is then milled a second time.

In a second heating step, the cured, milled composition is heated in an inert atmosphere, argon, or nitrogen at a temperature that causes formation of a ceramic comprising metal carbide and optionally metal nitride in a carbonaceous matrix. The ceramic may be in the form of a powder. FIG.

3 schematically illustrates the transfer 40 of carbon atoms from the carbon matrix 30 to the nanoparticle 50.

At this point, the powder may be heated in an oxidizing atmosphere to remove any remaining organic material. The powder is then combined with additional TPEB or other organic compound or polymer resin and milled again. This result is heated in an inert atmosphere, argon, or nitrogen at a temperature that causes formation of a ceramic comprising the carbide of the refractory metal and optionally the nitride of the refractory metal. This heating may be performed in a mold to form a shaped article.

Figure 4:
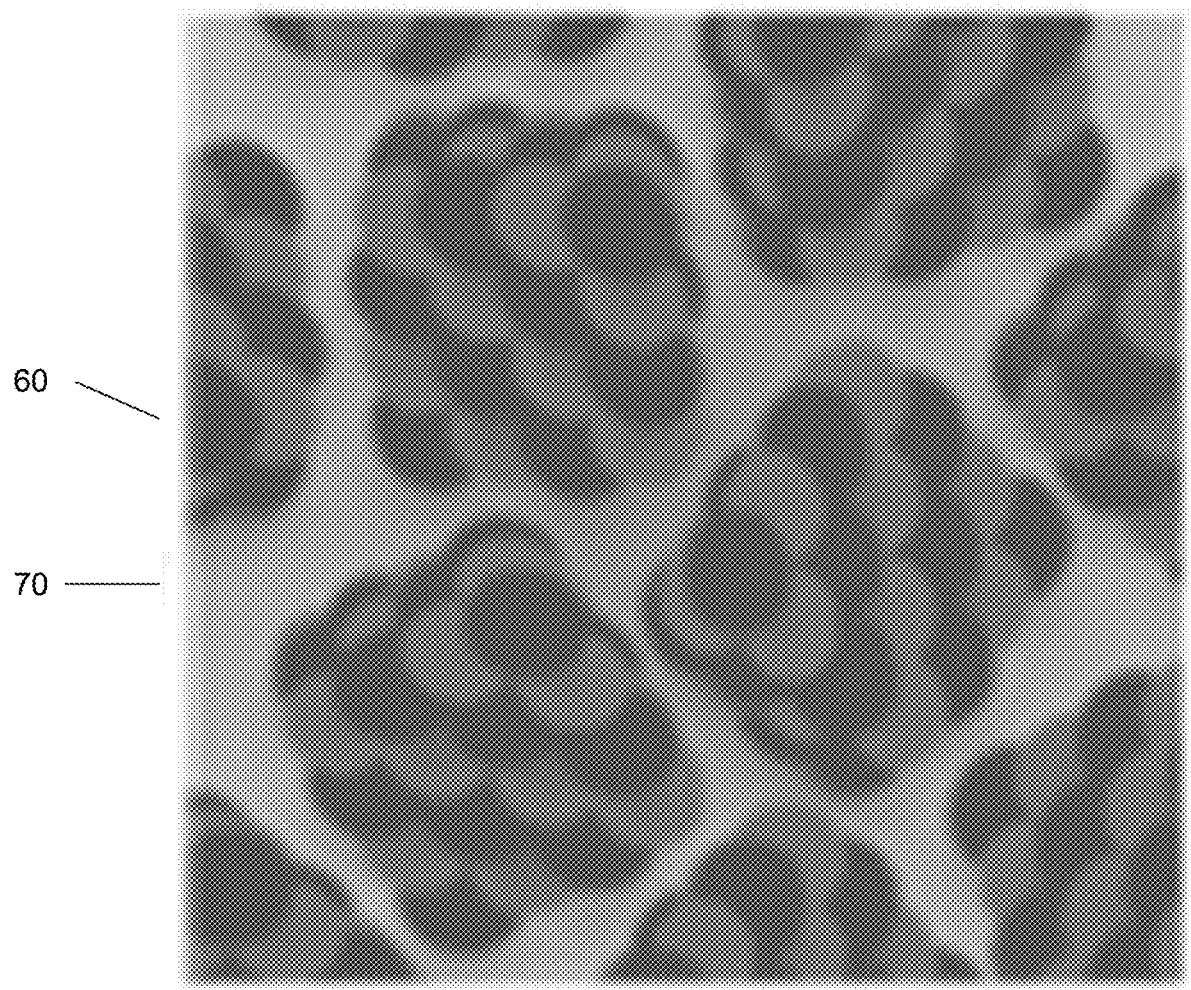
FIG. 4 schematically illustrates nanoparticles 50 and inclusions 60 in a carbonaceous matrix 70.

FIG. 4 schematically illustrates nanoparticles 50 and inclusions 60 in a carbonaceous matrix 70. Example heating steps and precursor materials are disclosed in U.S. Pat. Nos. 8,822,023; 8,865,301; 8,815,381; 8,778,488; and 10,189,747.

The nanoparticles in the ceramic may be for example, zirconium carbide or zirconium nitride. The ceramic may comprise, for example, at least 5%, 10%, 50%, 90%, 95%, or 99% by weight of the nanoparticles and/or filler. The balance of carbonaceous matrix may be a small amount sufficient to adhere the nanoparticles together.

The methods may be summarized as follows. Step 1: powdered metal or metal hydride+TPEB+nitrogen-rich polymer (optional)→precursor composition+milling→cure to thermoset→milling of thermoset to powder→heat to 1500° C. in either nitrogen (metal nitrides) or argon (metal carbides)→heat powdered ceramics in oxygen (remove excess carbon) (optional)→either pure metal nitride or metal carbide. Step 2: pure metal nitride or metal carbide+minute quantity of TPEB+milling→heat and cure to shaped thermoset→heat to shaped metal nitride or metal carbide embedded in minute quantity of carbon.

The milling of the precursor compositions in step 1 may reduce the metal particle size and activate its reaction with the carbon source, thereby lowering the temperature of metal carbide or metal nitride formation. Moreover, by varying the amount of metal compound that forms reactive metal particles relative to the polymer resin in step two, the amount of metal carbide or metal nitride within the final shaped ceramic composition can be changed with respect to the amount of carbon matrix in order to vary the properties of the resulting composition. The metal-carbide or metal nitride carbon-matrix compositions are expected to show enhanced toughness, owing to the presence of the relatively elastic carbon, which would exist in forms ranging from amorphous to nanotube to graphitic carbon.

Potential advantages and features of the disclosed products and methods include the following.

The method provides high-purity, high-yield synthesis of pure refractory nanoparticle metal nitrides or metal carbide ceramics with nanocrystalline domains in powdered and shaped forms from a reaction of a meltable polymeric resin with the appropriate metal powder or metal hydride powder and a nitrogen-rich polymer.

The method provides formation of either shaped refractory nanoparticle metal nitrides or metal carbides with nanocrystalline domains in a two-step method.

Regardless of the ratio of metal source to carbon source, the metal carbides or nitrides form as nanoparticles with nanocrystalline domains: this is a highly desirable result, as it is generally accepted that homogeneous nanocrystalline composites of ceramics will have better properties than their (more common) microparticle-based counterparts.

The synthetic process occurs under no applied pressure and at much lower temperatures than conventional synthesis and densification sintering methods for carbide and nitride ceramics.

By its very nature, the method improves facile customization of carbide or nitride and carbide- or nitride-carbon composites by liquid molding procedures (injection molding, vacuum molding, spreading, etc.), which is a far less costly and involved process than machining a hot press sintered material.

The native presence of an "elastic" carbon matrix allows for toughening of the inherently brittle ceramics. The carbon permits operation of the toughened ceramic at extremely high temperatures, owing to carbon's high melting point (>3000° C.). Ceramic/carbon-matrix compositions are currently sought for these reasons, and the present method permits straightforward preparation of these composites in a single step for the first time, in contrast to the traditional means of first forming the ceramic powder and then preparing the carbon-matrix composite under sintering conditions. Also, the ratio of ceramic to carbon is easily tuned based only on the ratio of metal-compound to carbon-precursor.

Step 2 of the process is versatile and can be applied to any carbide or nitride, regardless of whether it was synthesized using the step 1 method or using other means. It can incorporate other non-ceramic fillers, such as carbon reinforcements, metal inclusions, glass fibers, etc. It can be extrapolated and applied to borides, oxides, silicides, and other high-temperature refractory materials.

Carbon fiber-reinforced refractory metal carbide and metal nitride carbon matrix composites produced from the precursor compositions of step 1 and 2 may exhibit outstanding mechanical properties. They may offer superior performance under extreme conditions such as high temperatures, oxidative/ablative environments, and mechanical and thermal shock and repetitive stresses; such materials do not currently exist. Finely divided fiber-reinforced refractory nanoceramic carbon composites allow the consolidation of fully dense shaped solid components with extreme fracture resistance for uses in high stress and temperature applications. Examples include advanced engine components and automobiles, where increased operation temperature and mechanical integrity could translate into tremendous economic advantages. Such tough, easily shaped ceramic composites are critical to the next generation of jet engines, which are being designed to operate at higher internal temperatures and stresses than those in current service, and in advanced automobile engines and supporting components. The rails of a railgun would be improved with hard, high-temperature, conductive ceramic coatings. The materials could be used as tough, high temperature insulators and in the design of hard, conductive rails with superior wearability (no grooving). Metal nitrides show tunable electronic properties and, coupled with their high temperature stability and mechanical hardness, may find use in high-temperature electronics. In addition, these materials can be fabricated into high temperature ship deck plates for aircraft carriers, which require high toughness and superior heat-resistant composites. Lightweight, tough, and hard ceramics molded in shaped structures are in high demand for superior military armor (XSAPI and ESAPI plates) components. Such materials could provide vehicle and personnel protection against emerging ballistic threats, such as tungsten carbide-based armor-piercing rounds. Conversely, these materials may serve as kinetic projectiles and either improve the penetration capability or ablation resistance (crucial for railgun warheads) of new ammunition. The ability to fabricate pure, tough, and shaped refractory metal carbides or metal nitride components in two steps improves their economic viabilities and mission capabilities of a broad array of military systems.

As a proof-of-concept example, this procedure was applied to synthesize zirconium nitride (ZrN) from a mixture of Zr metal precursors (Zr and $ZrH_2$), an acetylenic resin, and a nitrogen-rich resin. The structure of the material after step 1, as derived from Zr and $ZrH_2$, is shown in the X-ray diffraction plot in FIG. 5. The structure of the material, as derived from $ZrH_2$, after step 2 is shown in the XRD plot in FIG. 6.

The following examples are given to illustrate specific applications. These specific examples are not intended to limit the scope of the disclosure in this application.

Example 1

Zirconium Nitride/Zirconium Carbonitride→Zirconium nitride (ZrN) and zirconium carbonitride ($ZrC_{0.5}N_{0.5}$) were synthesized from blends of zirconium metal (Zr) and TPEB. Alternatively, ZrN and $ZrC_{0.5}N_{0.5}$ composites were synthesized from blends of zirconium hydride ($ZrH_2$) and TPEB. Zr was blended together with TPEB for a ratio of 6.8 g of Zr per 1.0 gram of TPEB, and $ZrH_2$ was blended together with TPEB for a ratio of 6.4 g of $ZrH_2$ per 1.0 gram of TPEB. The two materials were blended together in a steel ball mill with steel grinding media and used nitrogen gas ($N_2$) or methylene chloride ($CH_2Cl_2$) organic liquid as the media that filled the void space between grinding media and metal and polymer particles. The blended materials were compacted into discs and heated in a tube furnace under flowing $N_2$ gas up to 1400° C. Table 1 summarizes the resulting densities of this material.

TABLE 1

| Zirconium Precursor | Grinding Media | Mass (g) | Width (mm) | Thickness (mm) | Disk Volume (cm³) | Volumetric Density (g/cm³) | Archimedes' Density (g/cm³) |
|---|---|---|---|---|---|---|---|
| Zr | $N_2$ | 0.89 | 13.00 | 1.98 | 0.26 | 3.38 | 4.48 |
|  | $CH_2Cl_2$ | 0.86 | 13.00 | 1.51 | 0.20 | 4.31 | 4.58 |
| $ZrH_2$ | $N_2$ | 0.88 | 13.00 | 1.72 | 0.23 | 3.86 | 4.45 |
|  | $CH_2Cl_2$ | 0.87 | 13.00 | 1.54 | 0.20 | 4.24 | 4.67 |

Visual inspection of the precursor powders and final ceramic discs showed that the initial powder mixtures retained dark-brown/grey/black colors (characteristic of bulk TPEB, Zr, and $ZrH_2$ particulate materials). Finalized samples were dense disks with dark yellow/golden/light-brown colors, which are typical for bulk ZrN materials.

Figure 5:
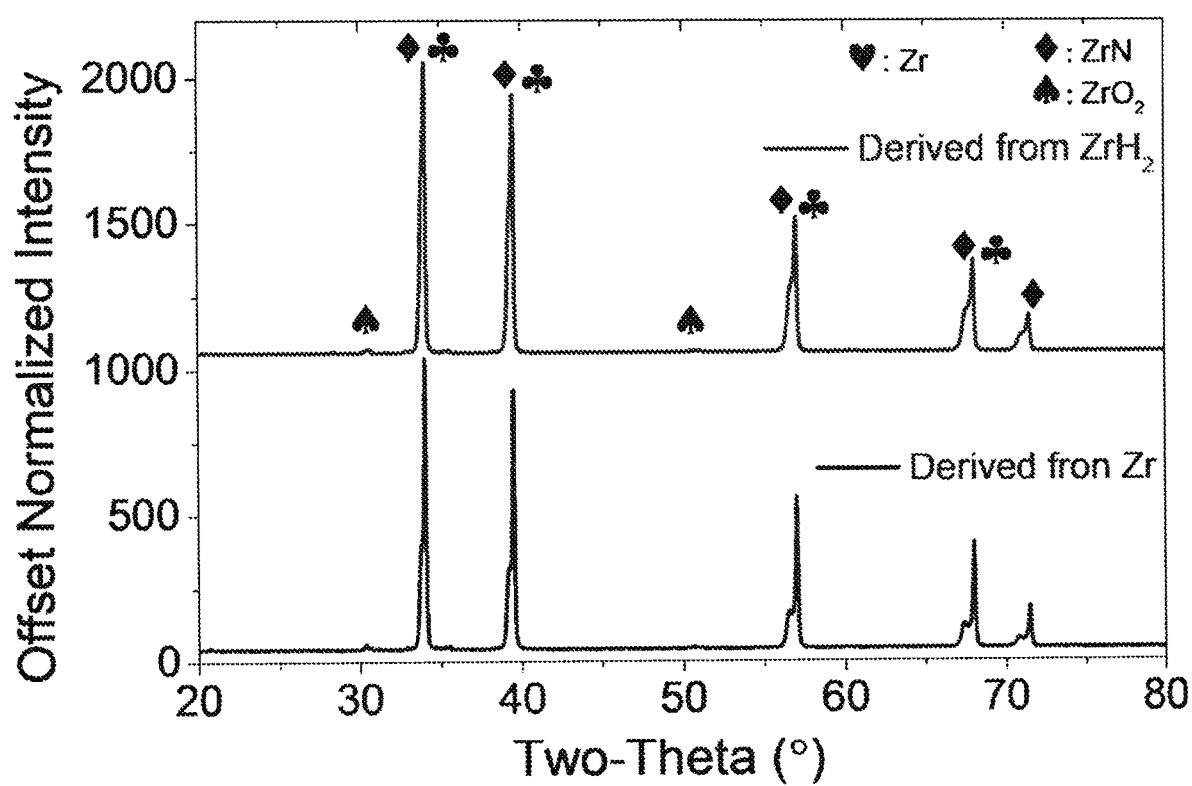
FIG. 5 shows X-ray diffraction (XRD) plots of ceramics synthesized from different metal precursors

X-ray diffraction analysis analyzed the crystal structure of the resulting composition. It is shown in FIG. 5. Composition analysis showed that resulting material was composed of predominantly zirconium nitride and zirconium carbonitride. The sample was devoid of any noticeable zirconium carbide (ZrC) phase. Some metal oxide ($ZrO_2$) material was present due to minimal surface oxidation of individual particles or overall disks as a result of exposure to oxygen post synthesis or trace amounts of oxygen during high-temperature processing. Table 2 shows the Rietveld analysis of the X-ray diffraction data.

TABLE 2

| Zirconium Precursor | Resulting Phase | Weight % | Lattice Parameter (nm) |
|---|---|---|---|
| Zr | $ZrC_{0.5}N_{0.5}$ | 98.7 | 33.9 |
|  | $ZrO_2$ | 1.2 | 68.5 |
| $ZrH_2$ | ZrN | 50.7 | 22.5 |
|  | $ZrC_{0.5}N_{0.5}$ | 46.5 | 19.8 |
|  | $ZrO_2$ | 2.8 | 21 |

Figure 6:
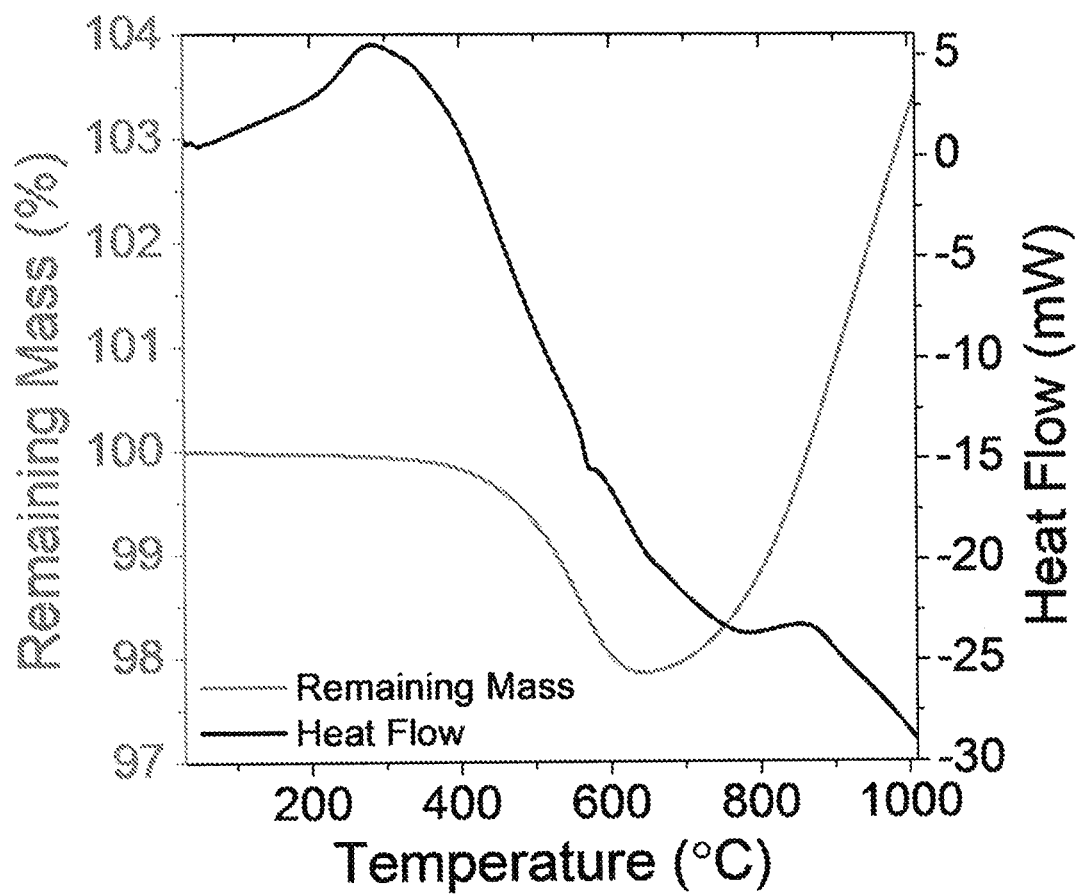
FIG. 6 shows thermogravimetric analysis of a reaction of metal and polymeric precursors.
Figure 7:
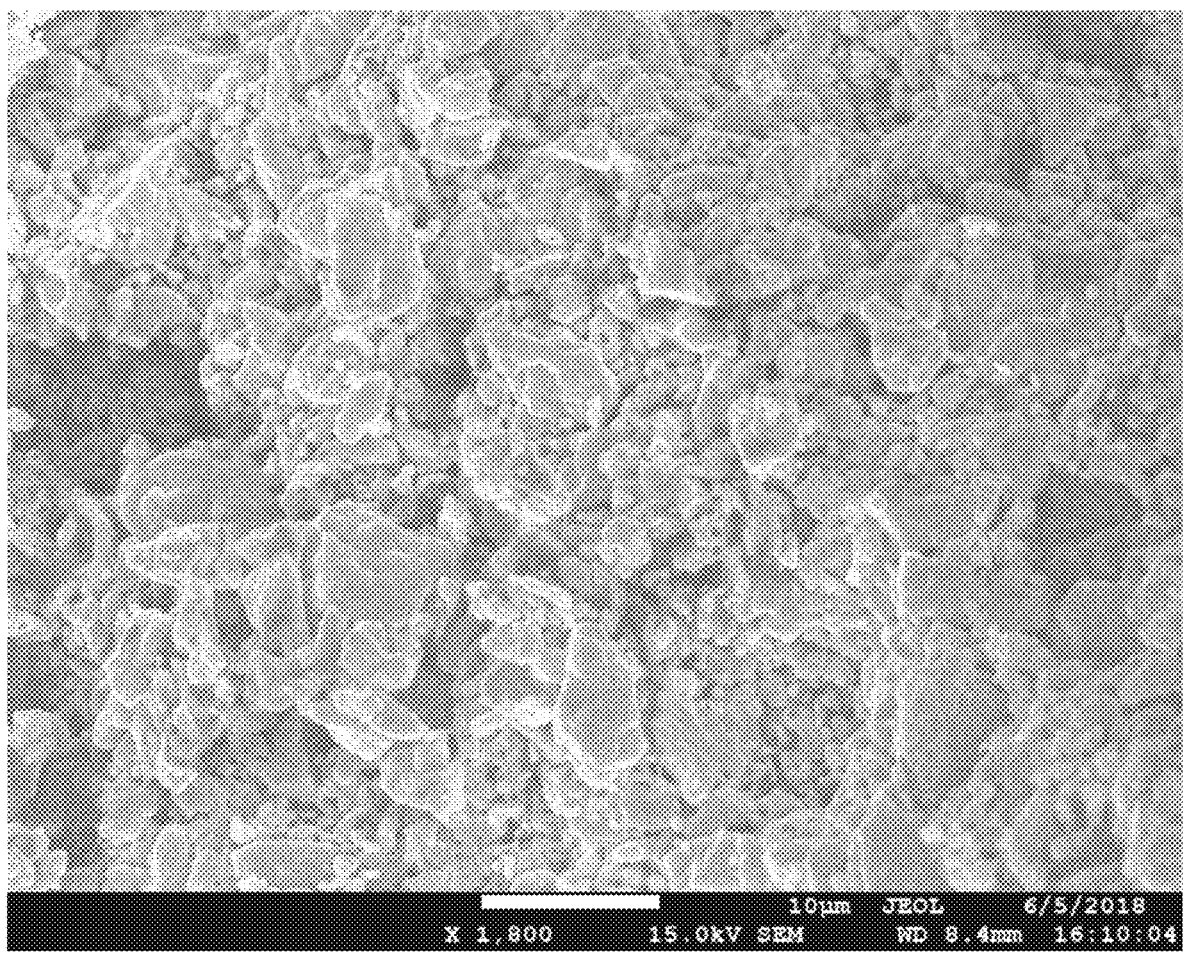
FIG. 7 shows a Scanning Electron Micrcopy (SEM) image of microstructure of ceramics

The reaction profiles (up to 1000° C.) of the blend of $ZrH_2$ and TPEB were analyzed using thermogravimetric analysis with a differential scanning calorimetry component (TGA-DSC). The test conditions resembled thermal treatments of the samples in nitrogen in a tube furnace. FIG. 6 shows the mass change of the materials as a function of temperature.

Scanning electron microscopy (SEM) imaging analyzed the morphology of particles formed during the reaction of $ZrH_2$ and TPEB under flowing $N_2$. The formed ZrN/$ZrC_{0.5}N_{0.5}$ particles were small (0.5-10 micrometers in diameter) and bound together on fractions of their edges. The morphology analysis reveals a uniform and homogeneous composition.

Example 2

Zirconium Nitride Two-Step Synthesis Composite—Zirconium nitride (ZrN) ceramic monoliths were synthesized via a two-step approach. In the first step, three-ingredient blends of $ZrH_2$, TPEB, and melamine ($C_3H_6N_6$), as well as three-ingredient blends of Zr, TPEB, and melamine were prepared using ball milling. $N_2$ gas, hexane ($C_6H_{14}$) fluid, and $CH_2Cl_2$ fluid were used to fill the void space between grinding media and sample particles. For materials that used Zr, the precursor blend included 3.06 g Zr; 0.46 g TPEB; and 0.69 g melamine. For materials that used $ZrH_2$, the precursor blend included 6.00 g $ZrH_2$; 0.71 g TPEB; and 1.38 g melamine. The ground particle blends were placed in a tube furnace (as a powder poured into a ceramic boat or compacted into a cold-pressed disc). These materials were heated up to 1400° C. under flowing $N_2$. The resulting material is a zirconium nitride powder. In the second step, the ZrN (hereafter referred to as "bulk ZrN") synthesized from the first step was blended together with mixtures of $ZrH_2$ and TPEB (hereafter referred to as "ZrN binder"). The ZrN binder was composed of 0.15 g TPEB per 1.00 g of $ZrH_2$. The ratio of bulk ZrN to ZrN binder was 9.0 grams of bulk ZrN per 1.0 grams of ZrN binder. The constituents were milled together using ball-milling. The resulting precursor powders were compacted into discs and heated up to 1400° C. in flowing $N_2$ gas. Table 3 summarizes the resulting densities of materials synthesized from $ZrH_2$.

TABLE 3

| Number | Zirconium Precursor | Mass (g) | Width (mm) | Thickness (mm) | Disk Volume (cm$^3$) | Volumetric Density (g/cm$^3$) |
|---|---|---|---|---|---|---|
| 1 | ZrCN—ZrH$_2$ | 6.469 | 25.2 | 4.18 | 2.08 | 3.10 |

Figure 8:
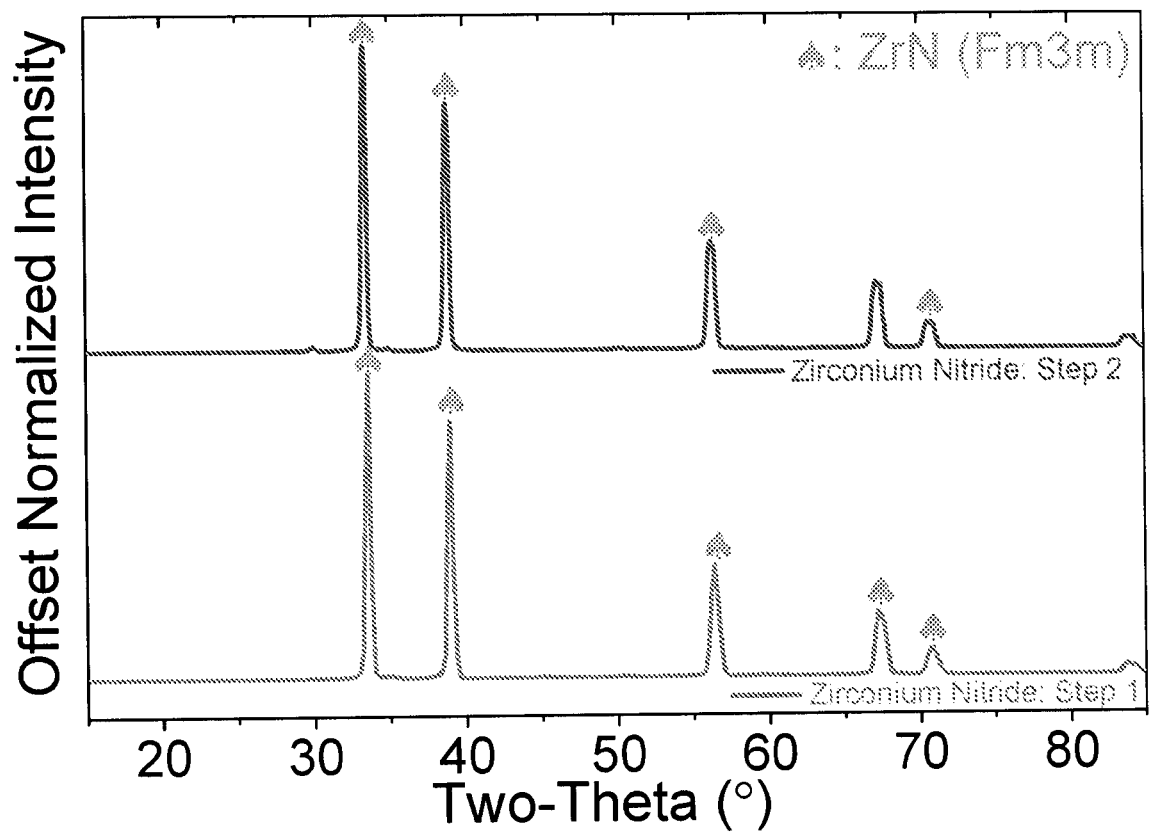
FIG. 8 shows XRD plots of ceramics.

XRD analysis of the ZrN powder (synthesized in the first step) and the ZrN ceramic (synthesized in the second step) showed that the crystal structure was identical for the two materials. The data is shown in FIG. 8. Table 4 summarizes the crystal properties and relative compositions of the phases that are present in the material.

TABLE 4

| Synthesis Stage | Phase | Weight % | Lattice Parameter (nm) |
|---|---|---|---|
| Phase 1 | ZrN$_{0.92}$ | 95.5 | 23.5 |
| | ZrO$_2$ | 1.7 | 16.3 |
| | Zr | 2.8 | 101.5 |
| Phase 2 | ZrN | 99.1 | 23.2 |
| | ZrO$_2$ | 0.9 | 28.6 |

Figure 9:
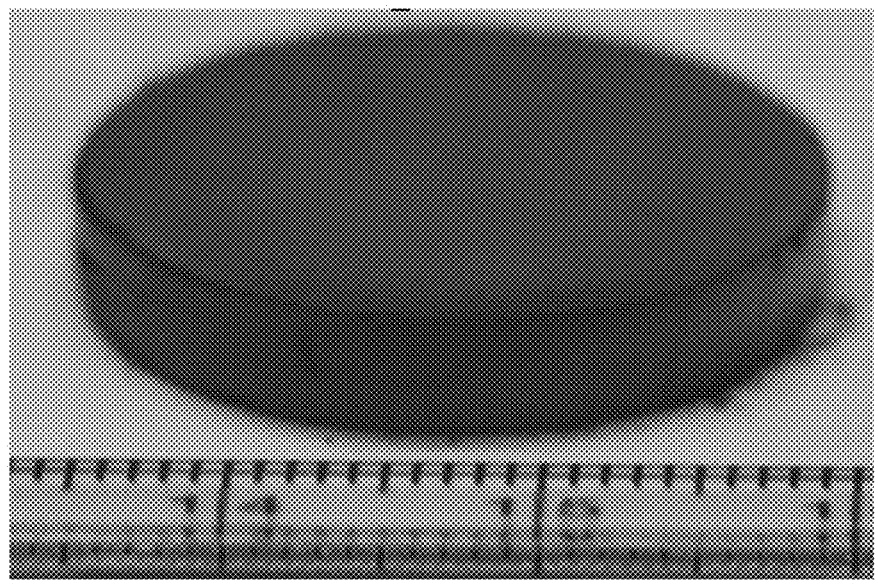
FIG. 9 shows a photograph of a metal nitride ceramic monolith.

Samples synthesized using the two-step method show a distinct yellow-gray color that is characteristic of bulk zirconium nitride. FIG. 9 shows a phot of a disc prepared using the two-step synthesis approach.

Example 3

Zirconium Nitride Formed Using Nitrogen-Rich Polymer Precursor—Zirconium nitride (ZrN) ceramic monoliths were synthesized via a two-step approach. In the first step, two-ingredient blends of ZrH$_2$ and 1,3,5-triazine-2,4,6-triamine (hereafter referred to as "TAM") were prepared using ball milling. N$_2$ gas, hexane (C$_6$H$_{14}$) fluid, and CH$_2$Cl$_2$ fluid were used to fill the void space between grinding media and sample particles. The precursor blend was composed of 4.267 g ZrH$_2$ and 0.639 g TAM. The blended powder was placed in an alumina crucible and heated in a tube furnace under flowing N$_2$ gas up to 1,450° C. The synthesis yielded ZrN powder. The second synthesis step blended together 4.267 g of ZrN and 0.639 grams of TAM using ball-milling. The blended powder was compacted into a disc and heated in a tube furnace under flowing N$_2$ gas up to 1,450° C.

Figure 10:
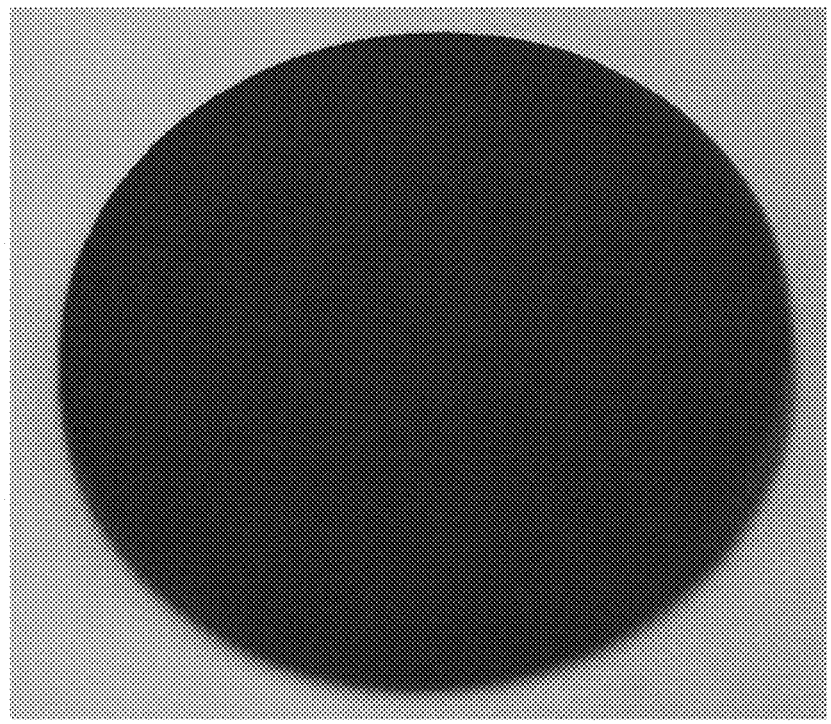
FIG. 10 shows a photograph of a metal nitride ceramic monolith.
Figure 11:
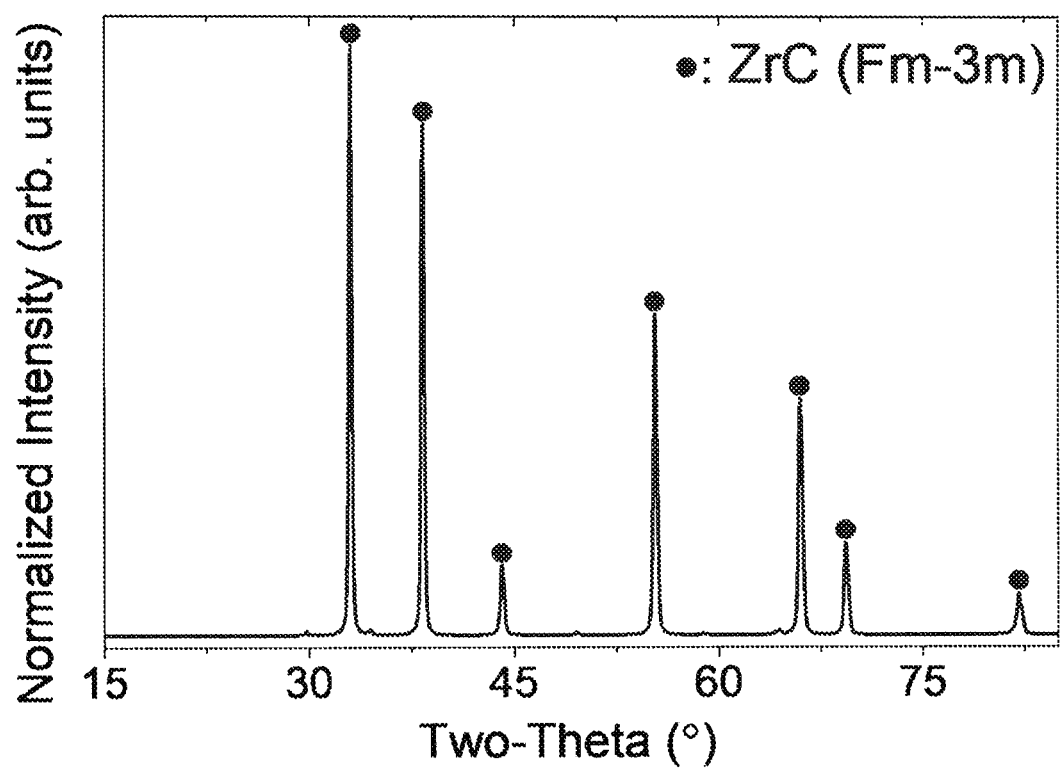
FIG. 11 shows an XRD plot of a metal nitride ceramic.

FIG. 10 shows a photograph of the resulting monolith. As revealed with XRD analyses, the resulting disc was composed of ZrN. FIG. 11 shows the XRD data from the disc.

Example 4

Zirconium Nitride Formed Using Nitrogen-Rich Polymer Precursor—Zirconium nitride (ZrN) ceramic monoliths were synthesized via a single-step approach. ZrH$_2$ (4.269 g), TPEB (0.159 g), and TAM (0.479 g) were blended together using ball-milling (in CH$_2$Cl$_2$ fluid with stainless steel grinding media). The blended powder mixture was compacted into discs using a hydraulic press while being heated up to 220° C. The disc was treated in a tube furnace with flowing N$_2$ gas at 1450° C. The resulting material was a rigid ceramic monolith composed of ZrN.

Example 5

Figure 12:
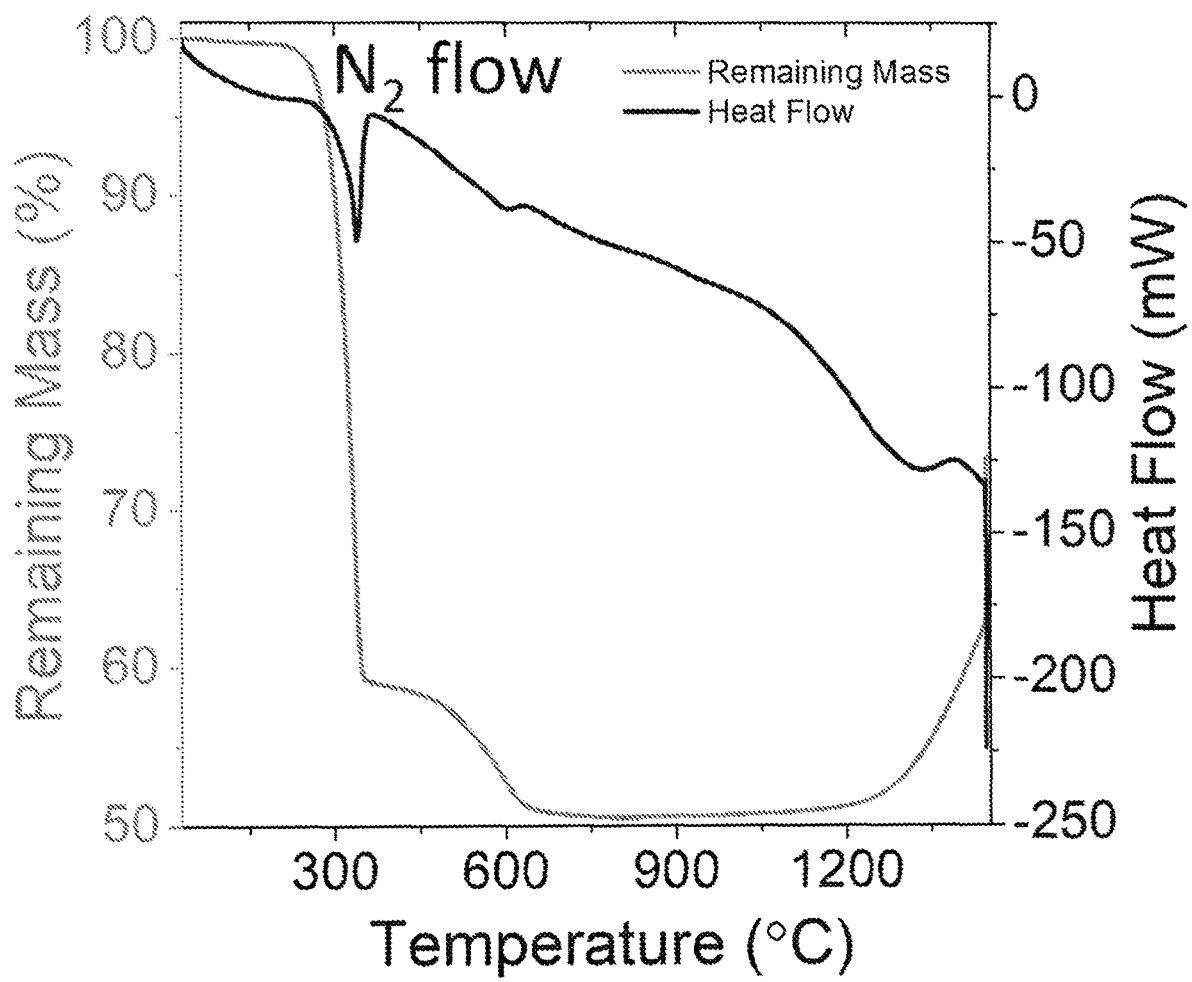
FIG. 12 shows thermogravimetric analysis of a reaction of metal and polymeric precursors
Figure 13:
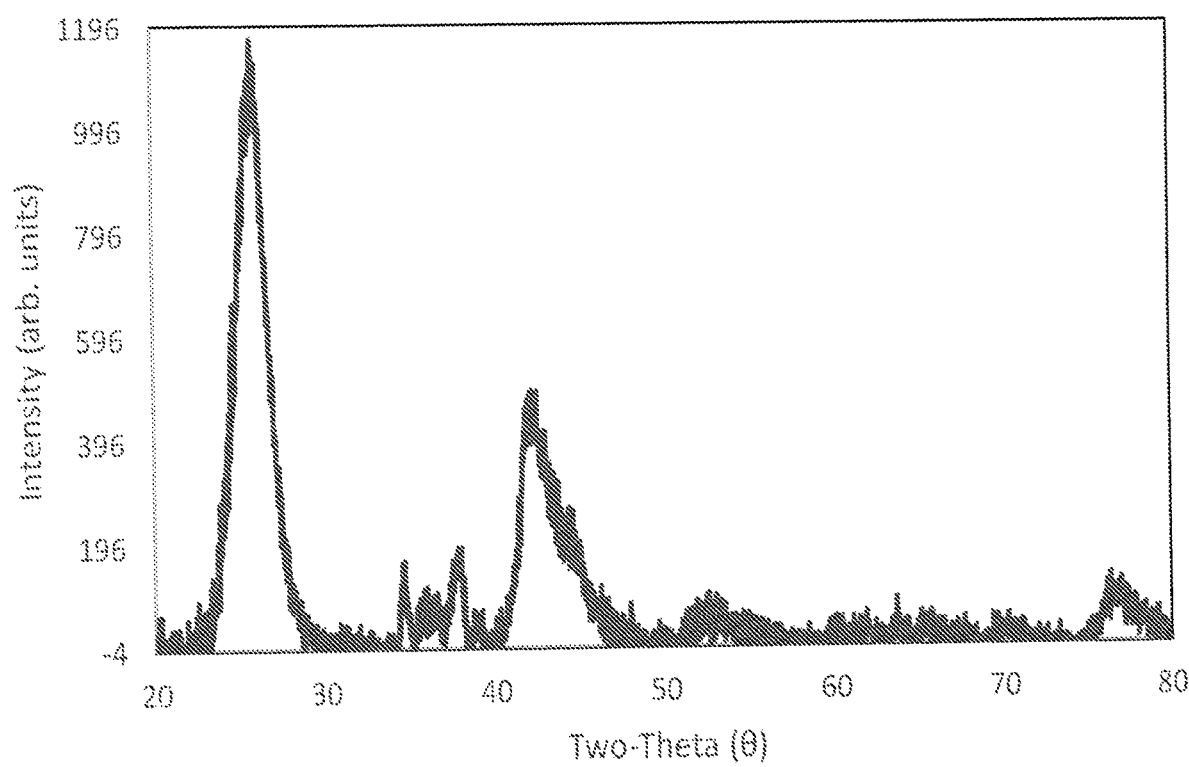
FIG. 13 shows an XRD plot of a metal nitride ceramic.

Boron Nitride Formed Using Melamine and a Polymer Resin—Boron nitride (BN) composite ceramic monoliths were synthesized via a single-step approach. Boron (2.5 g), TPEB (9.727 g), and melamine (3.125 g) were blended together using ball-milling in an N$_2$ environment. The material was compacted into a 25 mm diameter disc and treated in a tube furnace with flowing N$_2$ gas at 1450° C. FIG. 12 shows a thermal analysis of a sample of the mixture treated in a TGA instrument using the same conditions. The resulting structure, as determined with XRD analysis shown in FIG. 13, is a blend of hexagonal boron nitride, with small fractions of boron carbide and graphite.

Figure 14:
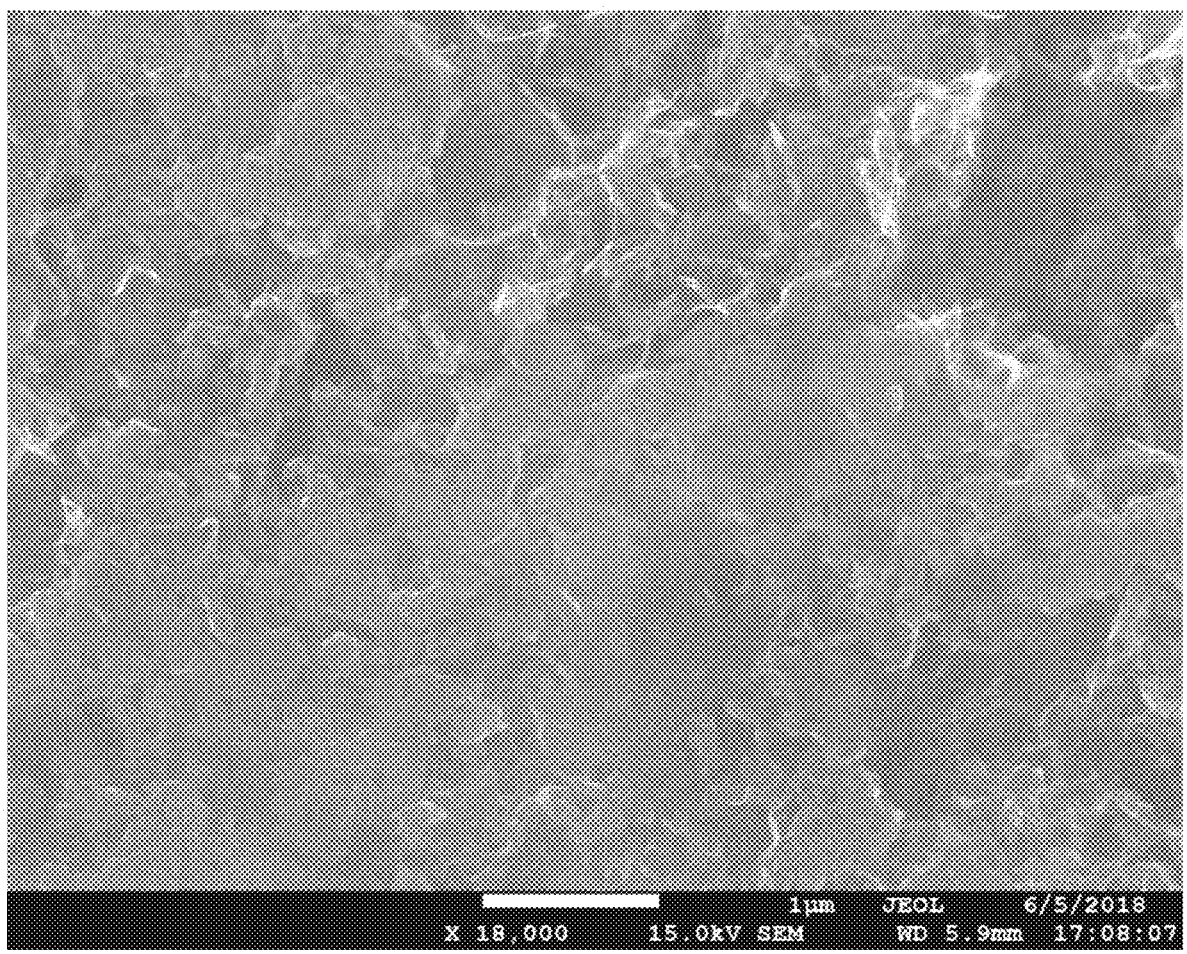
FIG. 14 shows an SEM image of microstructure of ceramics

Scanning electron microscopy (SEM) imaging analyzed the morphology of surface of composite formed during the reaction of Boron, TPEB, and melamine under flowing N$_2$. FIG. 14 shows the microscopy analysis. The morphology analysis reveals a uniform layer surface and homogeneous composition.

Example 6

Titanium Nitride Formed Using Melamine and a Polymer Resin—Titanium nitride (TiN) composite ceramic monoliths were synthesized via a single-step approach. Titanium (3.00 g), TPEB (0.79 g), and melamine (1.34 g) were blended together using ball-milling in an N$_2$ environment. The material was compacted into a disc and treated in a tube furnace with flowing N$_2$ gas at 1450° C.

Example 7

Vanadium Nitride Formed Using Melamine and a Polymer Resin—Vanadium nitride (VN) composite ceramic monoliths were synthesized via a single-step approach. Vanadium (3.00 g), TPEB (0.32 g), and melamine (1.26 g) were blended together using ball-milling in an N$_2$ environment. The material was compacted into a disc and treated in a tube furnace with flowing N$_2$ gas at 1450° C.

Example 8

Tantalum Nitride Formed Using Melamine and a Polymer Resin—Tantalum nitride (TaN) composite ceramic monoliths were synthesized via a single-step approach. Tantalum (3.00 g), TPEB (0.21 g), and melamine (0.36 g) were blended together using ball-milling in an N$_2$ environment. The material was compacted into a disc and treated in a tube furnace with flowing N$_2$ gas at 1450° C.

Example 9

Tungsten Nitride Formed Using Melamine and a Polymer Resin—Tungsten nitride (WN) composite ceramic monoliths were synthesized via a single-step approach. Tungsten (3.00 g), TPEB (0.21 g), and melamine (0.35 g) were blended together using ball-milling in an N$_2$ environment. The material was compacted into a disc and treated in a tube furnace with flowing N$_2$ gas at 1450° C.

Example 10

Silicon Nitride Formed Using a Blend of Two Polymer Resins—Silicon nitride (Si$_3$N$_4$) composite ceramic monoliths were synthesized via a single-step approach. Silicon metal (4.00 g), TPEB (0.680 g), and TAM (2.04 g) were blended together using ball-milling in a CH$_2$Cl$_2$ fluid environment. The material was compacted into a disc and treated in a tube furnace with flowing N$_2$ gas at 1450° C.

Figure 15:
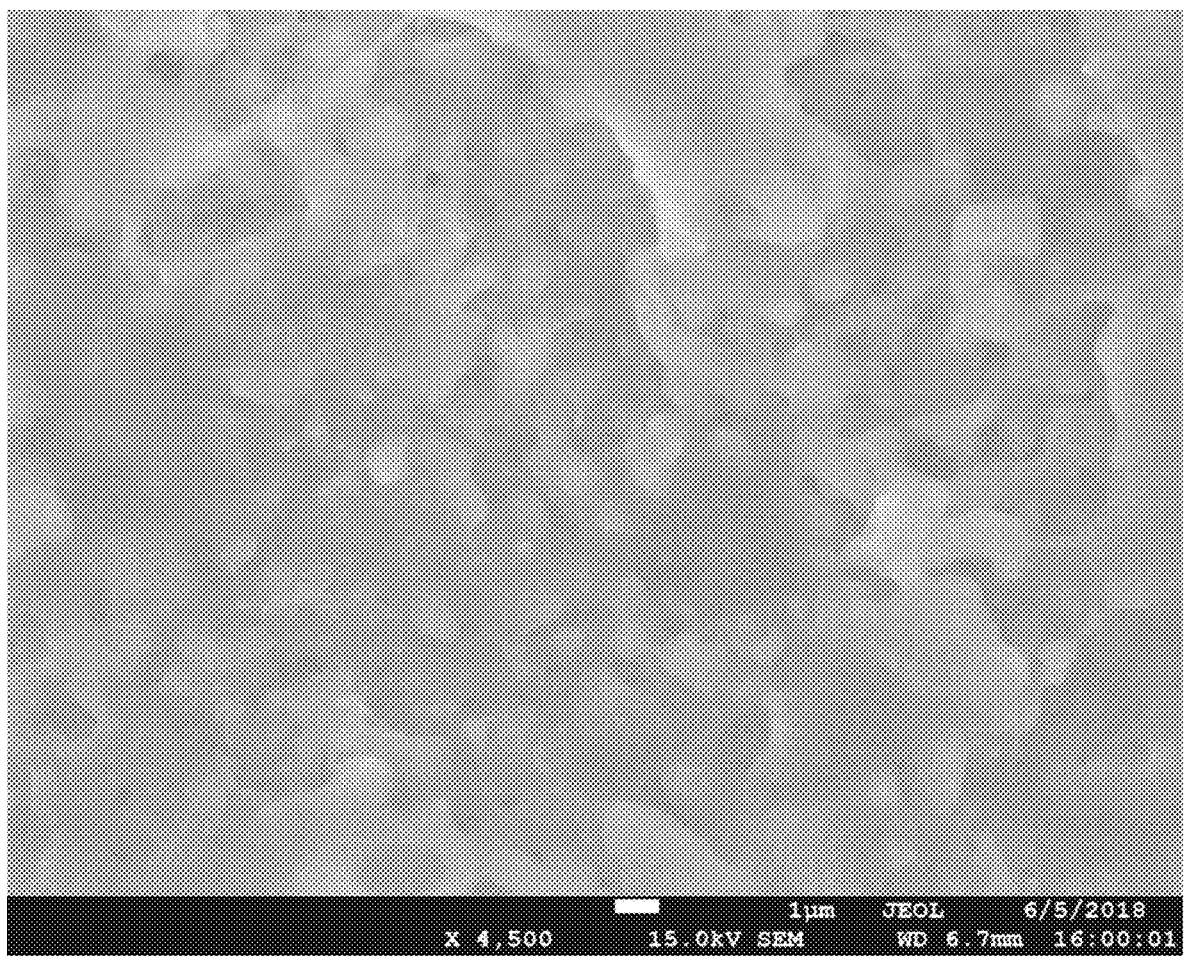
FIG. 15 shows an SEM image of microstructure of ceramics

Scanning electron microscopy (SEM) imaging analyzed the morphology of surface of composite formed during the reaction of silicon, TPEB, and melamine under flowing $N_2$. FIG. 15 shows the microscopy analysis. The morphology analysis reveals a uniform layer surface and homogeneous composition.

Figure 16:
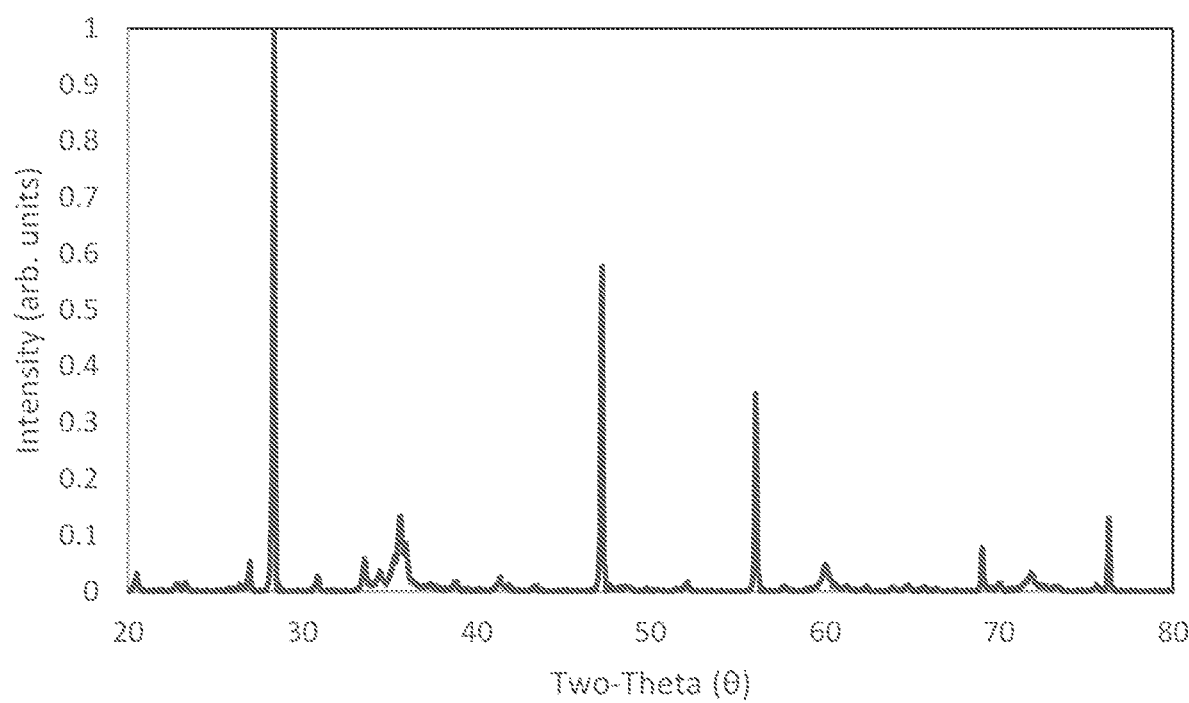
FIG. 16 shows an XRD plot of a metal nitride ceramic.

XRD analysis confirmed the structure of the resulting ceramic monolith. FIG. 16 shows the XRD plot. The predominant phases were Si, SiC, and $Si_3N_4$.

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A ceramic made by a method comprising:
    providing a composition comprising:
        nanoparticles of a refractory-metal carbide, boron carbide, or silicon carbide; and
        nanoparticles of a refractory-metal nitride, boron nitride, or silicon nitride;
            wherein the composition has a uniform distribution of the carbide and the nitride; and
            wherein the composition is in the form of a powder;
    combining the composition with an organic compound consisting of carbon and hydrogen or a polymer resin consisting of carbon and hydrogen to form a precursor composition;
    milling the precursor mixture; and
    heating the precursor composition in an inert atmosphere, argon, or nitrogen at a temperature that causes formation of the ceramic comprising the carbide, the nitride, and a carbonaceous matrix.

2. The ceramic of claim 1, wherein the nanoparticles comprise zirconium carbide and zirconium nitride, boron carbide and boron nitride, silicon carbide and silicon nitride, titanium carbide and titanium nitride, tantalum carbide and tantalum nitride, tungsten carbide and tungsten nitride, hafnium carbide and hafnium nitride, or vanadium carbide and vanadium nitride.

3. The composition of claim 1, wherein the composition comprises at least 5% by weight of the nanoparticles.

4. The ceramic of claim 1, wherein the organic compound is 1,2,4,5-tetrakis(phenylethynyl)benzene or a prepolymer thereof.

* * * * *